US011175950B1

United States Patent
Yang et al.

(10) Patent No.: US 11,175,950 B1
(45) Date of Patent: Nov. 16, 2021

(54) DYNAMIC REGULATION OF PARALLELISM FOR JOB SCHEDULING

(71) Applicant: Amazon Technologies, Inc., Seattle, WA (US)

(72) Inventors: Xu Yang, Bellevue, WA (US); Jason Roy Rupard, Renton, WA (US); Aswin Damodar, Seattle, WA (US); Devendra D Chavan, Seattle, WA (US); Ujjwal Kamal Kabra, Seattle, WA (US); Brian W Barrett, Bellevue, WA (US); Stephen William Kendrex, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/877,269

(22) Filed: May 18, 2020

(51) Int. Cl.
*G06F 9/48* (2006.01)
*G06F 9/54* (2006.01)
*G06F 9/38* (2018.01)

(52) U.S. Cl.
CPC .......... *G06F 9/4881* (2013.01); *G06F 9/3838* (2013.01); *G06F 9/3855* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 6,842,906 B1 * | 1/2005 | Bowman-Amuah | ... G06F 9/465 718/104 |
| 7,870,256 B2 * | 1/2011 | Talwar | ................... G06F 9/5072 709/226 |
| 8,881,168 B2 | 11/2014 | Bobroff et al. | |
| 9,128,763 B2 * | 9/2015 | Sarkar | .................... G06F 9/5066 |
| 9,176,774 B2 * | 11/2015 | Druyan | ................. G06F 9/4881 |
| 9,430,264 B2 * | 8/2016 | Tang | .................... G06F 9/45558 |
| 9,588,823 B2 | 3/2017 | Rajappa et al. | |
| 9,870,269 B1 | 1/2018 | Viswanathan et al. | |
| 9,996,593 B1 | 6/2018 | Bacthavachalu et al. | |
| 10,423,458 B2 * | 9/2019 | Ueno | ....................... H04L 67/38 |

* cited by examiner

*Primary Examiner* — Michael Sun
(74) *Attorney, Agent, or Firm* — Robert C. Kowert; Kowert, Hood, Munyon, Rankin & Goetzel, P.C.

(57) ABSTRACT

Methods, systems, and computer-readable media for dynamic regulation of parallelism for job scheduling are disclosed. A job scheduler sends a resource manager a request to execute a first set of compute jobs using a set of computing resources. The number of jobs corresponds to a first parallelism value. The job scheduler receives a response indicating that the number of computing resources was sufficient or insufficient to schedule the jobs. The job scheduler sends another request to execute another set of compute jobs whose number corresponds to a new parallelism value determined based at least in part on the response. If the number of computing resources was sufficient, the new parallelism value represents an increase over the first parallelism value. If the number of computing resources was insufficient, the new parallelism value represents a decrease from the first parallelism value.

20 Claims, 9 Drawing Sheets

DYNAMIC REGULATION OF PARALLELISM FOR JOB SCHEDULING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for dynamic regulation of parallelism for job scheduling are described. A multi-tenant provider network (also referred to as a cloud provider network) may provide convenient, on-demand network access to a shared pool of configurable computing resources that can be programmatically provisioned and released in response to customer commands. These resources can be dynamically provisioned, reconfigured, and released to adjust to variable load. For example, a set of computing resources (e.g., virtual compute instances) may be provisioned by a resource manager and used for concurrent execution of a set of batch compute jobs. The jobs may be provided by one or more clients via job queues, and a job scheduler may take jobs from the job queues and attempt to execute the jobs using the computing resources. Jobs may be sorted by creation date or other priority value. The job scheduler may attempt to schedule jobs in an approximate first-in first-out (FIFO) manner such that execution of individual jobs is initiated in an approximate order based (at least in part) on job creation dates or other priority values.

However, the number of computing resources available for job execution may change over time, e.g., due to failure or termination of resources. Using prior approaches, the job scheduler may have had poor (or no) visibility into the number of available computing resource slots. If the job scheduler requested execution of N jobs at a time, but the number of compute instances was insufficient for concurrent execution of N jobs, then a portion of the N jobs may have been deferred to the next round of execution. In some circumstances, a given job may have been deferred again and again while other jobs were scheduled successfully, thus violating an approximate FIFO guarantee to clients. Additionally, if the scheduler kept submitting more jobs than the computing resources had capacity to execute, then the resources may not have been shared fairly across different job queues. For example, the majority of the computing resources may have been used for jobs from only one particular queue.

The aforementioned challenges, among others, are addressed by embodiments of the techniques described herein, whereby a degree of parallelism for job scheduling may be dynamically regulated based (at least in part) on the availability of computing resources for job execution. For a given round (or time interval) of execution, the job scheduler may select a set of jobs whose number corresponds to the size of a congestion window. The size of the congestion window (the number of jobs) may be determined according to a parallelism value. The parallelism value may change over time such that the number of jobs submitted for one round (or time interval) of concurrent execution may vary from the number of jobs submitted for another round (or time interval) of concurrent execution. The parallelism value may be modified based on feedback from a resource manager, such as a response to an execution request that indicates whether or not all the jobs in the request were scheduled successfully.

For example, a first set of jobs (numbering W) may be selected by the job scheduler from a set of job queues and submitted to the resource manager for execution using a set of computing resources. If the resource manager responds that all the jobs were scheduled successfully (e.g., if the number of computing resources was sufficient to run all of the W jobs), then the job scheduler may increase the parallelism value and thus regulate the size of the congestion window for the next execution call. In some embodiments, the increase may be additive, e.g., such that the new parallelism value is W+1. However, if the resource manager responds that not all the jobs were scheduled successfully (e.g., if the number of computing resources was insufficient to run all of the W jobs), then the job scheduler may decrease the parallelism value and thus regulate the size of the congestion window for the next execution call. In some embodiments, the decrease may be multiplicative, e.g., such that the new parallelism value is W*0.5. By using a resource availability feedback protocol that results in additive increases when resources are sufficient, the size of the congestion window may grow smoothly. By using a resource availability feedback protocol that results in multiplicative decreases when resources are insufficient, queue starvation may be avoided. By reducing or eliminating queue starvation, the set of computing resources may be shared more fairly and evenly across different job queues, e.g., with the scheduler using a round-robin approach across the queues. Approximate FIFO scheduling may be performed if the number of computing resources is sufficient for the size of the congestion window.

As one skilled in the art will appreciate in light of this disclosure, embodiments may be capable of achieving certain technical advantages, including some or all of the following: (1) improving the approximate FIFO scheduling of batch compute jobs by preventing later jobs from being performed before earlier jobs using dynamic regulation of a congestion window size; (2) improving the throughput of batch job execution by gradually increasing the number of jobs that are submitted for concurrent execution by a set of computing resources; (3) reducing the number of idle computing resources reserved for batch job execution by gradually increasing the number of jobs that are submitted for concurrent execution by the set of computing resources; (4) reducing queue starvation and improving fairness by scheduling jobs across multiple job queues instead of allowing one queue to dominate the set of computing resources; and so on.

Figure 1:
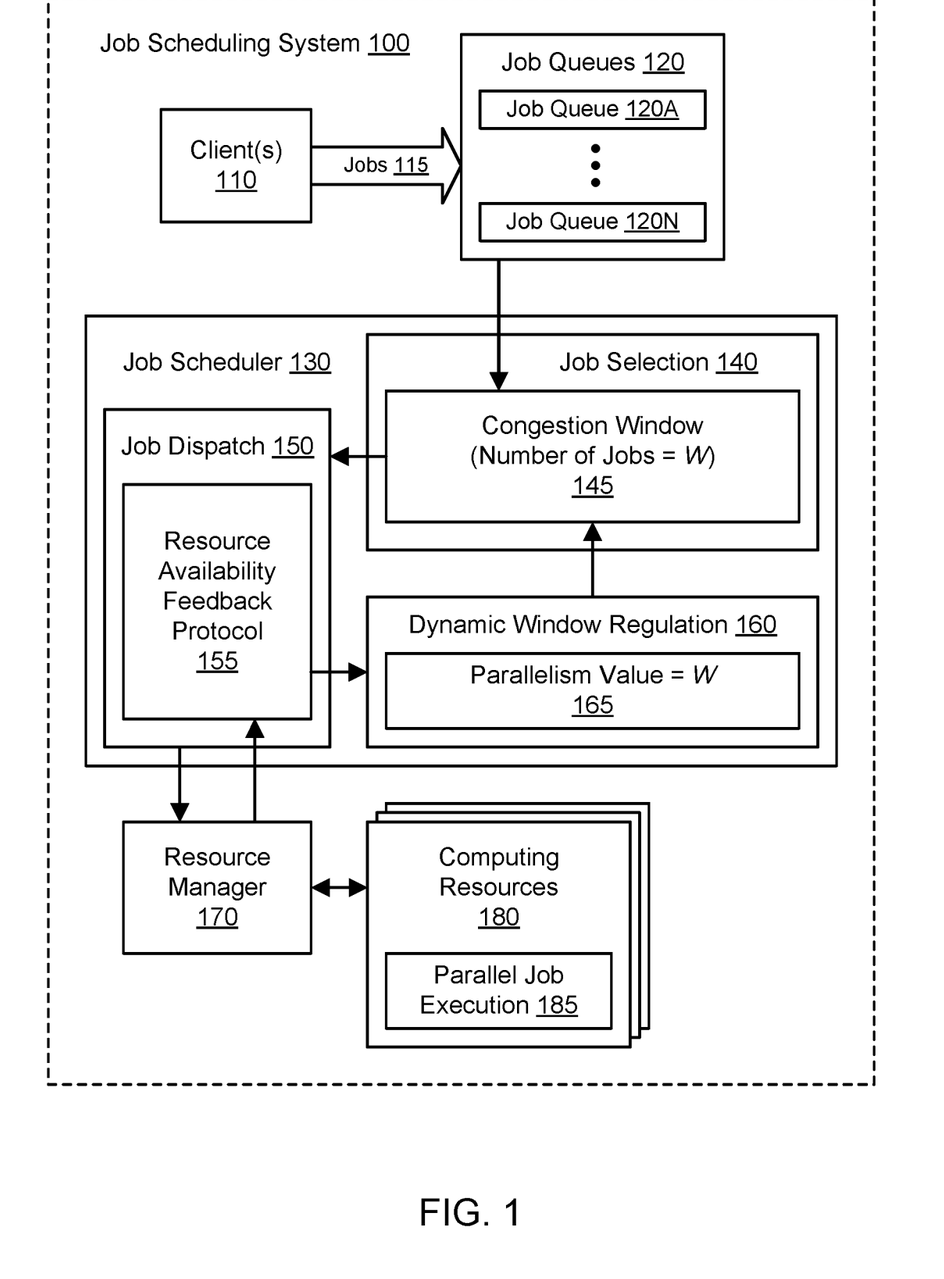
FIG. 1 illustrates an example system environment for dynamic regulation of parallelism for job scheduling, according to some embodiments.

FIG. 1 illustrates an example system environment for dynamic regulation of parallelism for job scheduling, according to some embodiments. A job scheduling system 100 may perform high-throughput scheduling and execution of batch compute jobs 115 with approximate FIFO scheduling and fair treatment of job queues 120. Using a job scheduler 130, jobs 115 in one or more job queues 120 may be submitted to a resource manager 170 that manages a set of computing resources 180 configured to perform concurrent job execution 185. A compute job may include a set of executable program code or a reference to one or more functions to be performed. A compute job may include one or more input values and/or one or more other parameter values to modify execution of the program code or other functions. The jobs 115 may be provided by one or more clients 110 of the job scheduler 130. The jobs 115 may be added to a plurality of job queues 120 such as job queue 120A through job queue 120N. In one embodiment, the job queues 120A-120N may be associated with a single client of the job scheduler 130. In one embodiment, the job queues 120A-120N may be associated with a plurality of clients of the job scheduler 130. The jobs 115 in the job queues 120A-120N may be sorted by creation date, submission date, or date of receipt in order to perform approximate FIFO scheduling. In one embodiment, the jobs 115 the job queues 120A-120N may be sorted according to a priority value such that higher-priority jobs tend to be scheduled before lower-priority jobs.

The job scheduler 130 may include a component 140 for job selection, a component 150 for job dispatch, and a component 160 for dynamic window regulation. A new set of compute jobs may be determined for each of a series of successive time intervals, e.g., every N seconds. Using the job selection component 140, a subset of the compute jobs 115 for the current time interval may be selected from multiple ones of the job queues 120 (e.g., queue 120A and queue 120N). In one embodiment, the subset of the jobs 115 may be taken from the queues 120 by a plurality of worker threads associated with the job scheduler 130. Using the dynamic window regulation component 160, the scheduler 130 may maintain a parallelism value 165 (e.g., W). The job selection component 140 may configure the size of a congestion window 145 according to the parallelism value 165. The parallelism value 165 may indicate the number of jobs whose concurrent execution may be attempted for a given time interval. As shown in the example of FIG. 1, the size of the congestion window (in terms of the number of jobs the window is configured to hold) may be set to the value W. The number of jobs selected by the job selection component 140 for the current time interval may be no more than W, where W is the size of the congestion window 145 as well as the corresponding parallelism value 165. In some embodiments, the parallelism value 165 and thus the size of the congestion window 145 may be initialized to a default value for the first time interval, e.g., W=1. In some embodiments, the parallelism value 165 and thus the size of the congestion window 145 may be initialized according to a number of computing resources 180 (e.g., compute instances) provisioned by the resource manager 170 or execution slots provided by those resources to perform concurrent execution of the batch compute jobs. In some embodiments, the parallelism value 165 and thus the size of the congestion window 145 may be initialized based (at least in part) on a batch job execution history for a particular client.

Using the job dispatch component 160, the job scheduler 130 may send one or more job execution requests to a resource manager 170 that brokers access to (or otherwise maanges) a set of computing resources 180 (e.g., compute instances) provisioned to perform concurrent execution 185 of batch compute jobs. The set of compute jobs may be sent to the resource manager for each time interval, e.g., every N seconds. The job execution request may include the same number of jobs (W) as the parallelism value 165. In one embodiment, all of the compute jobs for the current time interval may be sent using one request. In one embodiment, the compute jobs for the current time interval may be sent using a plurality of requests. The computing resources 180 may be provisioned by the resource manager 170 from one or more resource pools offered by a multi-tenant provider network. The number of computing resources 180 in the set may vary over time. For example, a particular resource may be terminated or otherwise deprovisioned by the resource manager 170, thus reducing the availability of the set of resources 180 for batch job execution. As another example, a particular resource may fail and be unable to accept additional compute jobs, thus reducing the availability of the set of resources 180 for batch job execution. As yet another example, an additional resource may be provisioned by the resource manager 170, thus increasing the availability of the set of resources 180 for batch job execution.

Over time, the number of computing resources 180 may shrink below the parallelism value 165, thus delaying execution of one or more jobs in a batch beyond the current time interval due to a lack of resource availability. Over time, the number of computing resources 180 may grow beyond the parallelism value 165, thus leaving one or more computing resources idle for one or more time intervals. To adapt the job scheduling system 100 to the current availability of the computing resources 180, a resource availability feedback protocol 155 may be used to dynamically modify the parallelism 165 value and thus the size of the congestion window 145. Using the feedback protocol 155, the parallelism value 165 may be changed from time interval to time interval such that the number of jobs submitted for one interval may vary from the number of jobs submitted for another interval. The parallelism value 165 may be modified based on feedback from the resource manager 170, such as a response to an execution request that indicates whether all the jobs in the request were scheduled successfully.

For example, a first set of jobs (numbering W) may be selected by the job scheduler 130 from a set of job queues 120 and submitted to the resource manager 130 or execution 185 using a set of computing resources 180. If the resource manager 170 responds that all the jobs were scheduled successfully (e.g., if the number of computing resources 180 was sufficient to run the W jobs), then the job scheduler 130 may increase the parallelism value 165 and thus regulate the size of the congestion window 145 for the next execution call. In some embodiments, the increase may be additive, e.g., such that the new parallelism value is W+1. However, if the resource manager 170 responds that not all the jobs were scheduled successfully (e.g., if the number of computing resources 180 was insufficient to run the W jobs), then the job scheduler 130 may decrease the parallelism value 165 and thus regulate the size of the congestion window 145 for the next execution call. In some embodiments, the resource manager 170 may report back to the job scheduler 130 that the number of computing resources 180 was insufficient for scheduling a particular job with particular resource requirements, even if other computing resources that do not satisfy the job's requirements remain available for that interval. In some embodiments, the decrease may be multiplicative, e.g., such that the new parallelism value is W*0.5.

By using a resource availability feedback protocol 155 that results in additive increases when resources are sufficient, the size of the congestion window 145 may grow smoothly. In some embodiments, the congestion window 145 may grow smoothly from interval to interval without adding delays. For example, if the interval is one second and W=1 initially, then the parallelism value 165 may grow from 1 to 256 in about 256 seconds as long as sufficient resources are available. In some embodiments, delays may be added for multiplicative decreases to the parallelism value 165. For example, if the interval is one second, then the parallelism value 165 may be divided by two every thirty seconds rather than every second as long as insufficient resources are available. Thus the parallelism value 165 may grow from 1 to 256 or shrink from 256 to 1 in approximately the same amount of time. By using a resource availability feedback protocol 155 that results in multiplicative decreases when resources are insufficient, queue starvation may be avoided. By reducing or eliminating queue starvation, the set of computing resources 180 may be shared more fairly and evenly across different job queues 120A-120N, e.g., with the scheduler 130 using a round-robin approach across the queues. Approximate FIFO scheduling may be performed if the number of computing resources 180 is sufficient for the size of the congestion window 145.

In some embodiments, the parallelism value 165 may be determined based (at least in part) on the availability or unavailability of sufficient computing resources 180 for a set of jobs during a given interval. In some embodiments, the parallelism value 165 may also be determined based (at least in part) on one or more other factors such as the availability of one or more other services or components that are consumed in connection with job execution 185. For example, a cloud storage service may be used to store output of the jobs 115, and that storage service may have throughput limits. The dynamic window regulation 160 may perform rate limiting to prevent such dependencies from being overwhelmed by a high request volume. The rate limiting may be performed based on one or more additional signals provided by the one or more dependencies, e.g., an instruction to slow down the volume of requests.

The computing resources 180 may represent physical compute instances or servers that can be configured to perform a variety of computing tasks, e.g., by executing customer-specified jobs or workloads. In some embodiments, any of computing resources 180 may be implemented by the example computing device 3000 illustrated in FIG. 6. In some embodiments, virtual compute instances (including virtual machines) may be launched on computing resources provisioned by the resource manager 170. Virtual machines may represent an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances."

Components of the job scheduling system 100 may convey network-based service requests to one another via one or more networks. In various embodiments, the network(s) may encompass any suitable combination of networking hardware and protocols necessary to establish network-based communications between components. For example, the network(s) may generally encompass the various telecommunications networks and service providers that collectively implement the Internet. The network(s) may also include private networks such as local area networks (LANs) or wide area networks (WANs) as well as public or private wireless networks. For example, two different components may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given component and the Internet as well as between the Internet and another component. It is noted that in some embodiments, components may communicate using a private network rather than the public Internet.

In some embodiments, the job scheduling system 100 may offer an application programming interface (API) or other programmatic interface that permits other components to invoke the functionality of the job scheduling system, e.g., to schedule jobs for batch execution. An API refers to an interface and/or communication protocol between a client and a server, such that if the client makes a request in a predefined format, the client should receive a response in a specific format or initiate a defined action. In a cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. In one embodiment, the job scheduling system 100 may be accessible via a command-line interface (CLI) in which textual prompts are displayed to the user, and textual responses to those prompts are received from the user. In one embodiment, the job scheduling system 100 may be accessible via a graphical user interface (GUI) in which GUI elements representing prompts are displayed to the user, and responses to those prompts (e.g., user interaction with GUI elements such as checkboxes and text entry panes) are received from the user. In one embodiment, the job scheduling system 100 may be accessible via a voice-enabled interface in which audio prompts are presented to the user, and voice responses to those prompts are received from the user. In some embodiments, the GUI and/or voice-enabled interface may be built on top of the CLI.

Figure 6:
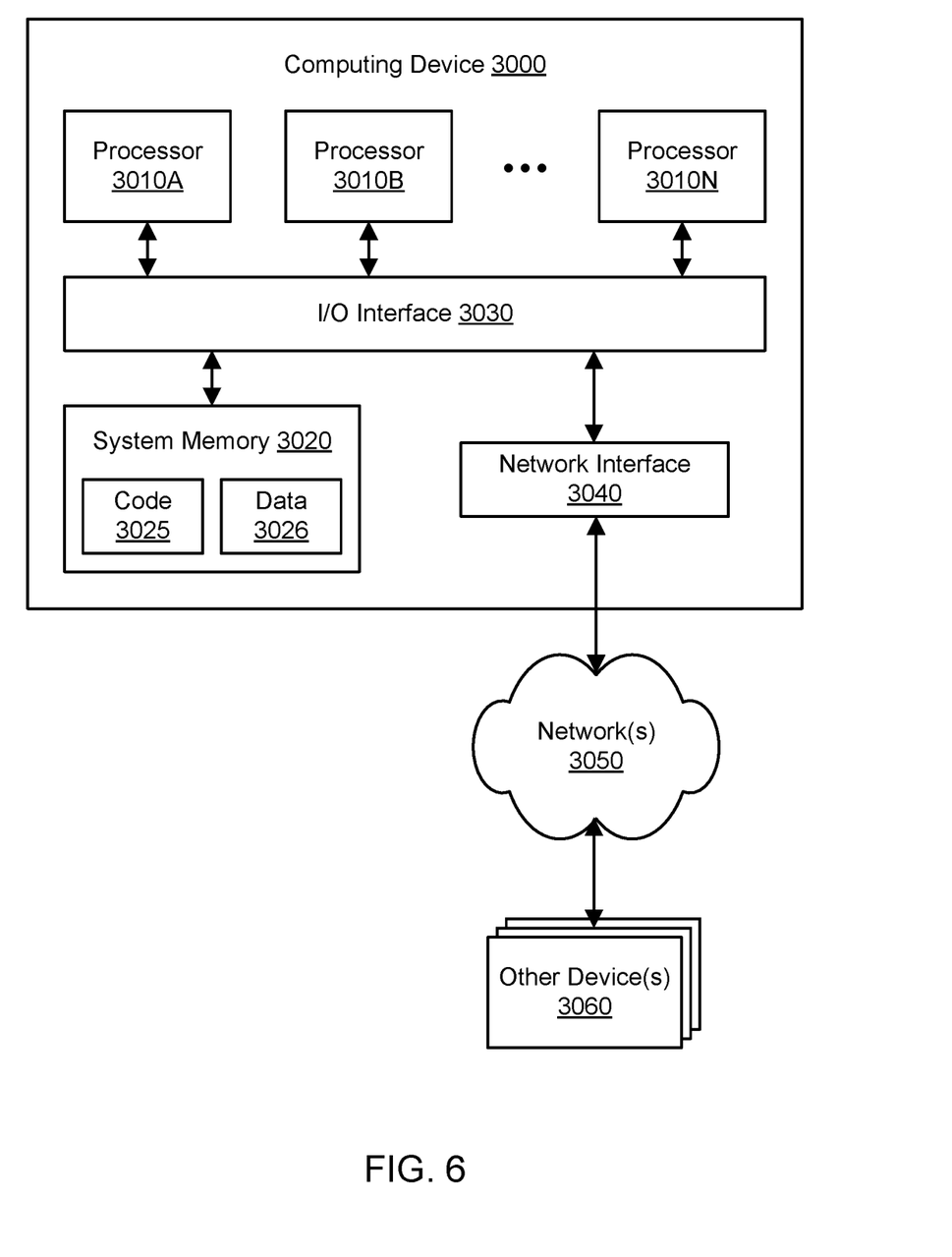
FIG. 6 illustrates an example computing device that may be used in some embodiments.

The job scheduling system 100 may be implemented using any suitable number and configuration of computing devices, any of which may be implemented by the example computing device 3000 illustrated in FIG. 6. The computing devices may be located in any suitable number of data centers or geographical locations. In various embodiments, at least some of the functionality of the job scheduling system 100 may be provided by the same computing device or by different computing devices. If any of the components of the job scheduling system 100 are implemented using different computing devices, then the components and their respective computing devices may be communicatively coupled, e.g., via one or more networks. Each of the components of the job scheduling system 100 may represent any combination of software and hardware usable to perform their respective functions, as discussed as follows. Operations implemented by the job scheduling system 100 may be performed automatically, e.g., without a need for user initiation or user intervention after an initial configuration stage, and programmatically, e.g., by execution of program instructions on at least one computing device. It is contemplated that the job scheduling system 100 may include additional components not shown, fewer components than shown, or different combinations, configurations, or quantities of the components shown.

Figure 2A:
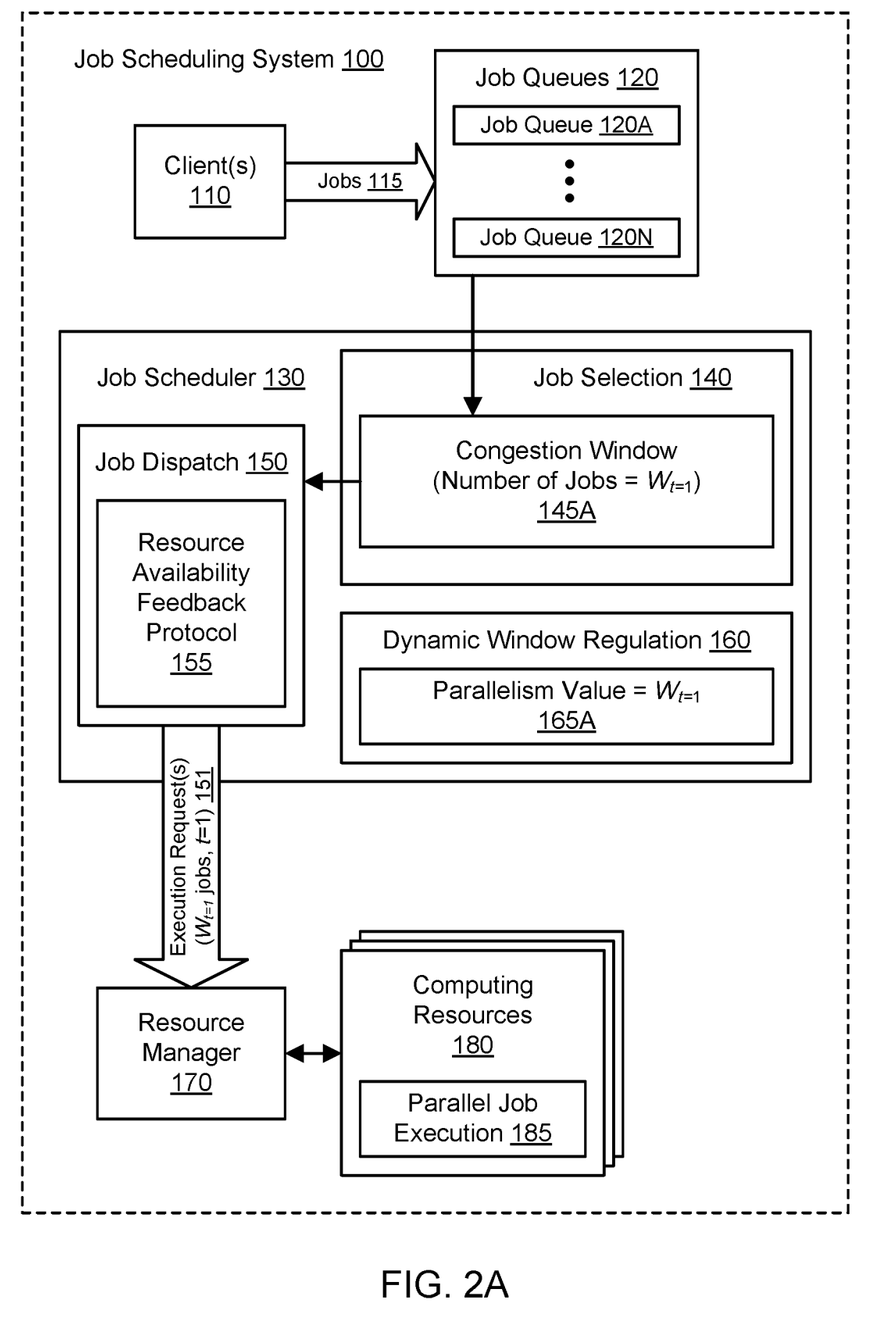
FIG. 2A, FIG. 2B, and FIG. 2C illustrate further aspects of the example system environment for dynamic regulation of parallelism for job scheduling, including an additive increase to a parallelism value based (at least in part) on computing resource availability, according to some embodiments.
Figure 2B:
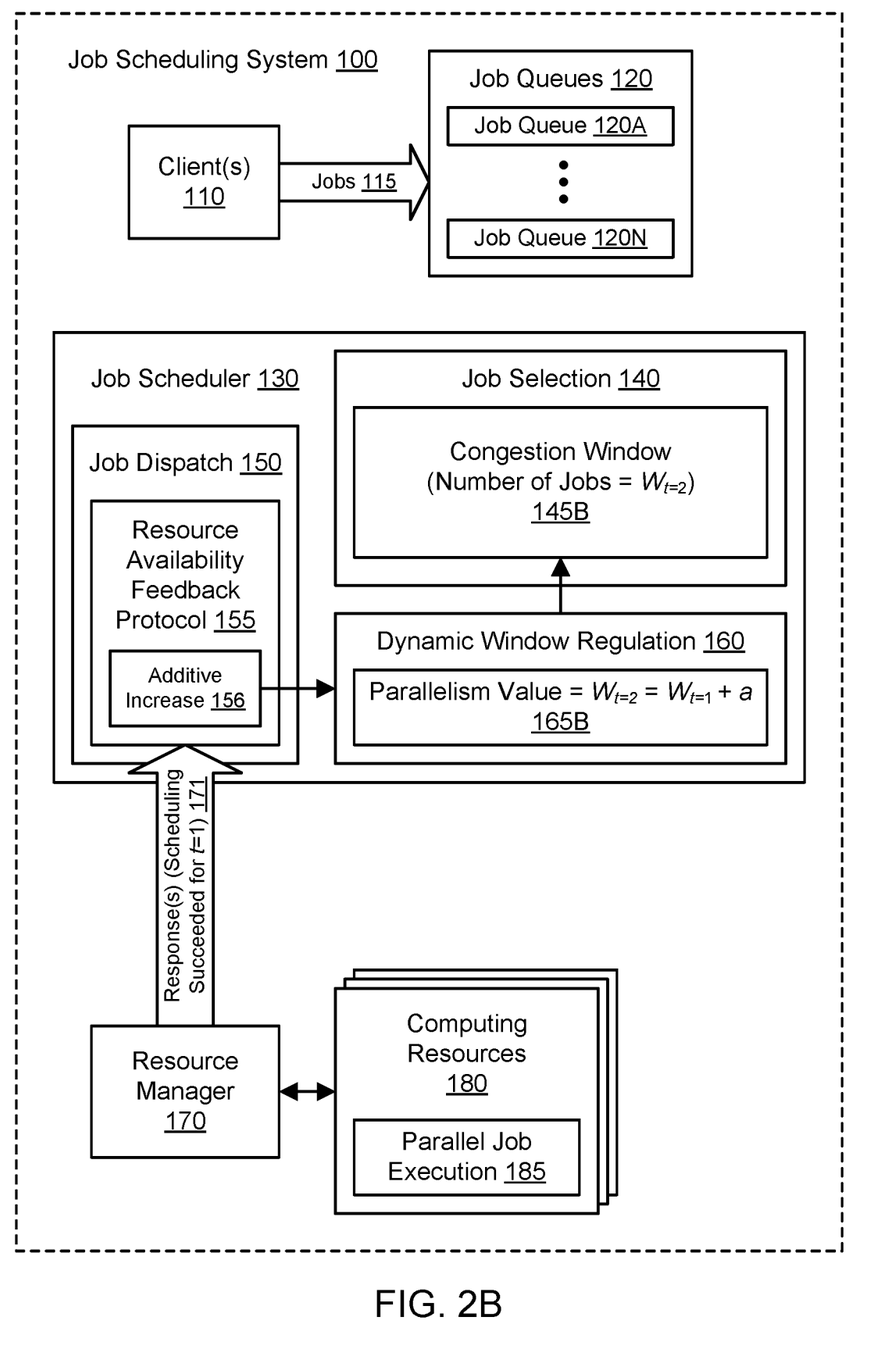
Figure 2C:
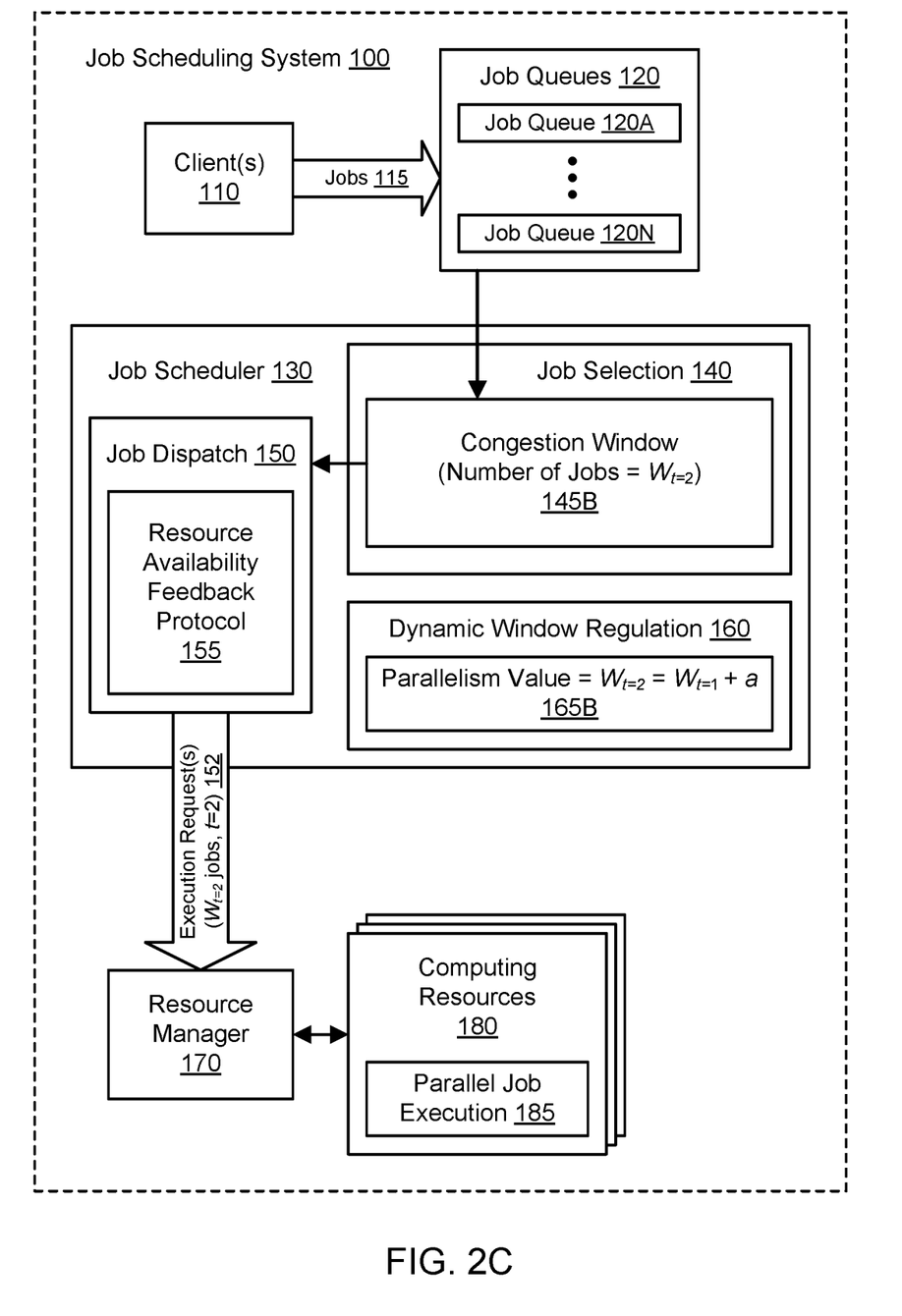

FIG. 2A, FIG. 2B, and FIG. 2C illustrate further aspects of the example system environment for dynamic regulation of parallelism for job scheduling, including an additive increase to a parallelism value based (at least in part) on computing resource availability, according to some embodiments. FIG. 2A is an example illustrating the state of the system 100 at the beginning of a time interval t=1. Using the dynamic window regulation component 160, the scheduler 130 may maintain a parallelism value 165A (e.g., $W_{t=1}$) for the time interval t=1. For example, the parallelism value 165A ($W_{t=1}$) may be 7. The job selection component 140 may configure the size of a congestion window 145A according to the parallelism value 165A. As shown in the example of FIG. 2A, the size of the congestion window 145A (in terms of the number of jobs the window is configured to hold) may be set to the value $W_{t=1}$ for the time interval t=1. Thus the number of jobs selected by the job selection component 140 for the current time interval may be no more than $W_{t=1}$. Using the job selection component 140, a subset of the compute jobs 115 numbering no more than $W_{t=1}$ for the current time interval may be selected from multiple ones of the job queues 120 (e.g., queue 120A and queue 120N). In one embodiment, the subset of the jobs 115 may be taken from the queues 120 by a plurality of worker threads associated with the job scheduler 130.

Using the job dispatch component 160, the job scheduler 130 may send one or more job execution requests 151 to a resource manager 170 that brokers access to a set of computing resources 180 (e.g., compute instances) provisioned to perform concurrent execution 185 of batch compute jobs. The job execution request(s) 151 may include the same number of jobs ($W_{t=1}$) as the parallelism value 165A and congestion window 145A. In one embodiment, all of the $W_{t=1}$ compute jobs for the current time interval t=1 may be sent using one request 151. In one embodiment, the $W_{t=1}$ compute jobs for the current time interval t=1 may be sent using a plurality of requests 151.

Over time, the number of computing resources 180 may shrink below the parallelism value, thus delaying execution of one or more jobs in a batch beyond the current time interval due to a lack of resource availability. Over time, the number of computing resources 180 may grow beyond the parallelism value, thus leaving one or more computing resources idle for one or more time intervals. To adapt the job scheduling system 100 to the current availability of the computing resources 180, the resource availability feedback protocol 155 may be used to dynamically modify the parallelism value and thus the size of the congestion window. As shown in the example of FIG. 2B, the job scheduler 130 may receive one or more responses 171 to the execution request 151 from the resource manager 170. The response(s) 171 may be received at the end of the time interval t=1 or at the start of the next time interval t=2. The response(s) 171 may indicate whether the number or amount of computing resources 180 was sufficient to schedule execution of all of the set of compute jobs for their interval t=1. In the example of FIG. 2B, the number or amount of computing resources 180 may be deemed sufficient because all the jobs were successfully scheduled for the time interval t=1. In one embodiment, the successful scheduling of individual jobs may be reported to individual worker threads of the job scheduler 130, and the job scheduler may aggregate the individual responses to determine whether all of the jobs were scheduled successfully. If the scheduler 130 receives a single response 171 from the resource manager 170, the response may include a signal or parameter value such as "continue" if all jobs were scheduled or a signal or parameter value such as "slow down" if not all jobs were scheduled.

Based (at least in part) on the successful response(s) 171 for the interval t=1, the feedback protocol 155 may perform an additive increase 156 to the parallelism value for the next interval t=2. A new parallelism value 165B ($W_{t=2}$) may be determined that represents an increase in the size of the congestion window 145B for the interval t=2 and a corresponding increase in the number of jobs that can be submitted with the next request for batch job execution. In some embodiments, the increase may be additive, where the new parallelism value 165B ($W_{t=2}$) is the old parallelism value 165A ($W_{t=1}$) plus another positive value 'a' to implement steady growth. For example, the new parallelism value $W_{t=2}$ of eight may be calculated by adding one to the old parallelism value $W_{t=1}$. In some embodiments, the increase may be multiplicative, where the new parallelism value 165B ($W_{t=2}$) is the old parallelism value 165A ($W_{t=1}$) times a positive factor greater than one (e.g., 1.1) to implement steady growth. The same additive term 'a' or factor may be used across multiple time intervals.

The job selection component 140 may configure the size of the congestion window 145B according to the new parallelism value 165B. As shown in the example of FIG. 2B, the size of the congestion window 145B (in terms of the number of jobs the window is configured to hold) may be set to the value $W_{t=2}$ (e.g., eight) for the time interval t=2. Thus the number of jobs selected by the job selection component 140 for the time interval t=2 may be no more than $W_{t=2}$. Using the job selection component 140, another subset of the compute jobs 115 numbering no more than $W_{t=2}$ for the time interval t=2 may be selected from multiple ones of the job queues 120 (e.g., queue 120A and queue 120N). In one embodiment, the subset of the jobs 115 may be taken from the queues 120 by a plurality of worker threads associated with the job scheduler 130.

As shown in the example of FIG. 2C, using the job dispatch component 160, the job scheduler 130 may send one or more job execution requests 152 to the resource manager 170 for the interval t=2. The job execution request(s) 152 may include the same number of jobs ($W_{t=2}$) as the parallelism value 165B and congestion window 145B. In one embodiment, all of the $W_{t=2}$ compute jobs for the current time interval t=2 may be sent using one request 152. In one embodiment, the $W_{t=2}$ compute jobs for the current time interval t=2 may be sent using a plurality of requests 152.

Figure 3A:
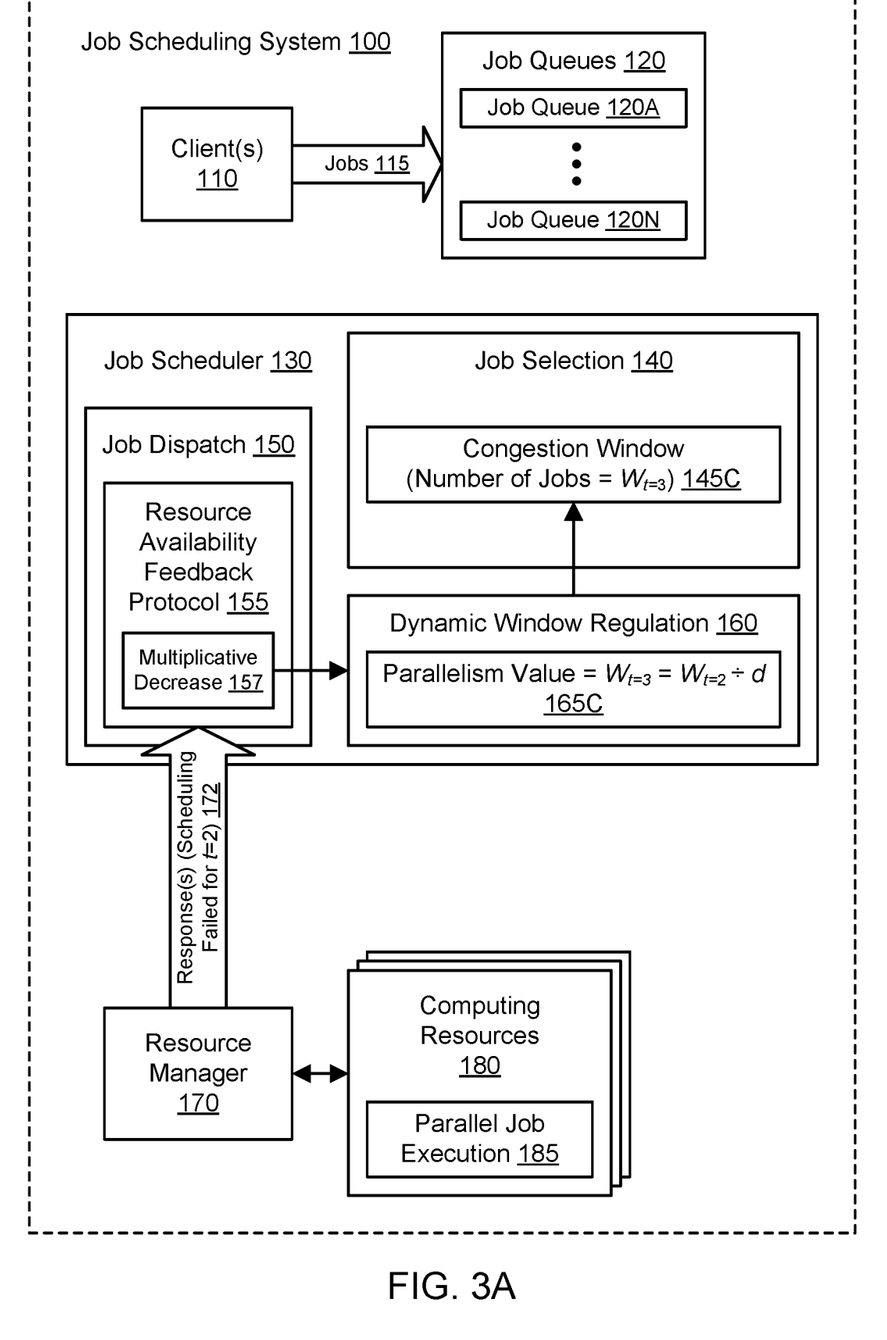
FIG. 3A and FIG. 3B illustrate further aspects of the example system environment for dynamic regulation of parallelism for job scheduling, including a multiplicative decrease from a parallelism value based (at least in part) on computing resource unavailability, according to some embodiments.
Figure 3B:
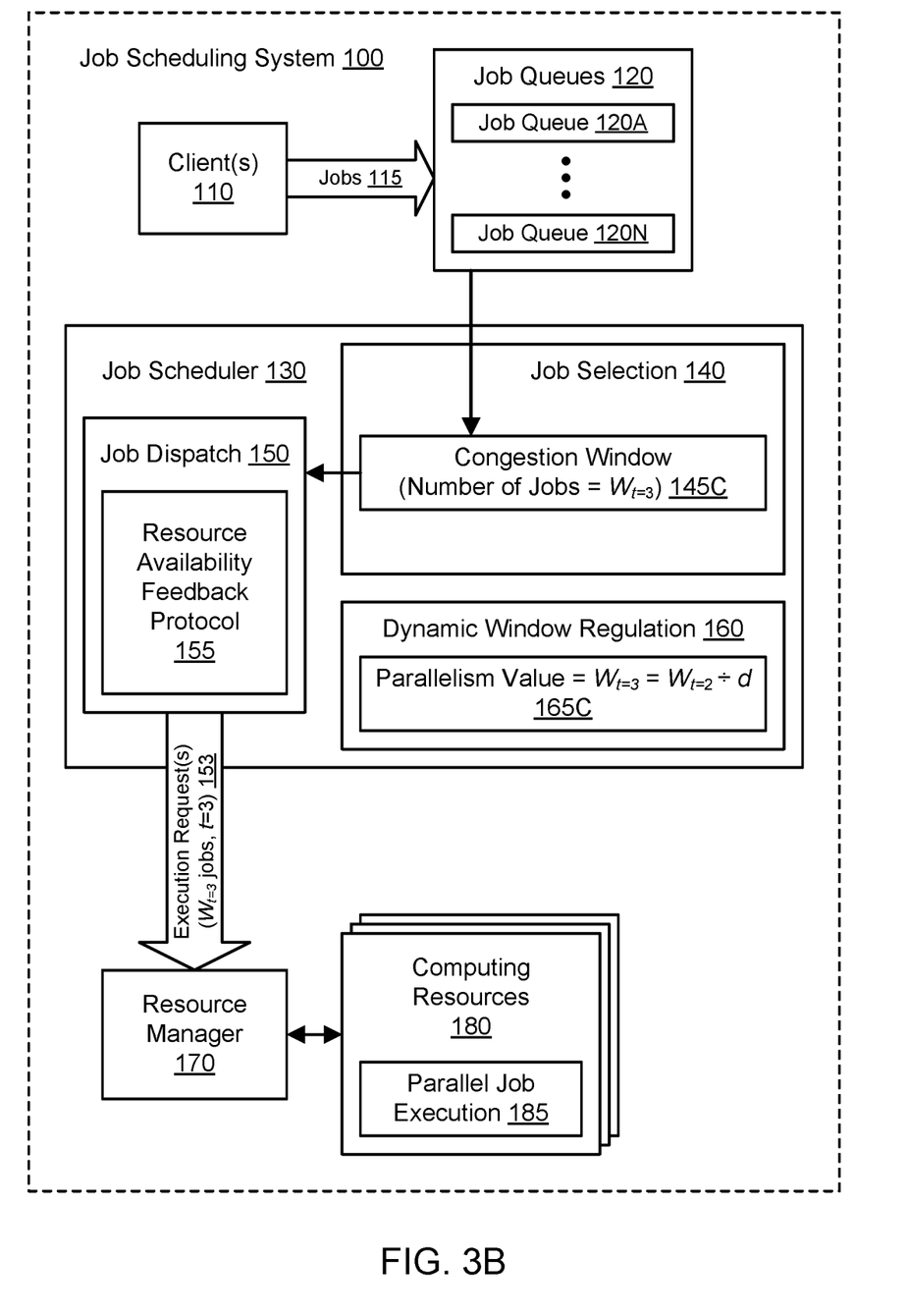

FIG. 3A and FIG. 3B illustrate further aspects of the example system environment for dynamic regulation of parallelism for job scheduling, including a multiplicative decrease from a parallelism value based (at least in part) on computing resource unavailability, according to some embodiments. Over time, the number of computing resources 180 may shrink below the parallelism value 165B, thus delaying execution of one or more jobs in a batch beyond the current time interval due to a lack of resource availability. To adapt the job scheduling system 100 to the current availability of the computing resources 180, the resource availability feedback protocol 155 may be used to dynamically modify the parallelism value and thus the size of the congestion window. As shown in the example of FIG. 3A, the job scheduler 130 may receive one or more responses 172 to the execution request(s) 152 from the resource manager 170. The response(s) 172 may be received at the end of the time interval t=2 or at the start of the next time interval t=3. The response(s) 172 may indicate whether the number or amount of computing resources 180 was sufficient to schedule execution of all of the set of compute jobs for their interval t=2. In the example of FIG. 3A, the number or amount of computing resources 180 may be deemed insufficient because at least one of the jobs in the request(s) 152 was not successfully scheduled for the time interval t=2. In one embodiment, the successful or unsuccessful scheduling of individual jobs may be reported to individual worker threads of the job scheduler 130, and the job scheduler may aggregate the individual responses to determine whether all of the jobs were scheduled successfully. If the scheduler 130 receives a single response 172 from the resource manager 170, the response may include a signal or parameter value such as "continue" if all jobs were scheduled or a signal or parameter value such as "slow down" if not all jobs were scheduled.

Based (at least in part) on the unsuccessful response(s) 172 for the interval t=2, the feedback protocol 155 may perform a multiplicative decrease 157 to the parallelism value for the next interval t=3. A new parallelism value 165C ($W_{t=3}$) may be determined that represents an increase in the size of the congestion window 145C for the interval t=3 and a corresponding increase in the number of jobs that can be submitted with the next request for batch job execution. In some embodiments, the decrease may be multiplicative, where that the new parallelism value 165C ($W_{t=3}$) is the old parallelism value 165B ($W_{t=2}$) times a factor greater than zero and less than one (e.g., 0.5) or divided by a divisor 'd' larger than one (e.g., two). For example, the new parallelism value 165C may be calculated as 8/2=4. In some embodiments, the decrease may be subtractive, e.g., such that the new parallelism value 165C ($W_{t=3}$) is the old parallelism value 165B ($W_{t=2}$) minus a number. The same multiplicative factor, divisor 'd', or subtractive number may be used across multiple time intervals. In one embodiment, the parallelism value may not be reduced to a value less than one.

The job selection component 140 may configure the size of the congestion window 145C according to the new parallelism value 165C. As shown in the example of FIG. 3A, the size of the congestion window 145C (in terms of the number of jobs the window is configured to hold) may be set to the value $W_{t=3}$ (e.g., four) for the time interval t=3. Thus the number of jobs selected by the job selection component 140 for the time interval t=3 may be no more than $W_{t=3}$. Using the job selection component 140, another subset of the compute jobs 115 numbering no more than $W_{t=3}$ for the time interval t=3 may be selected from one or more of the job queues 120. In one embodiment, the subset of the jobs 115 may be taken from the queues 120 by a plurality of worker threads associated with the job scheduler 130.

As shown in the example of FIG. 3B, using the job dispatch component 160, the job scheduler 130 may send one or more job execution requests 153 to the resource manager 170 for the interval t=3. The job execution request(s) 153 may include the same number of jobs ($W_{t=3}$) as the parallelism value 165C and congestion window 145C. In one embodiment, all of the $W_{t=3}$ compute jobs for the current time interval t=3 may be sent using one request 153. In one embodiment, the $W_{t=3}$ compute jobs for the current time interval t=3 may be sent using a plurality of requests 153.

In some embodiments, increasing the size of the congestion window as shown in FIG. 2B and FIG. 2C may temporarily violate an approximate FIFO guarantee of the job scheduling system 100 because not enough resources were available to handle the higher parallelism value 165B. Thus execution of one or more of the jobs submitted for time interval t=2 may be delayed until a subsequent time interval, e.g., after execution of one or more jobs with later creation dates or lower priority values. In some embodiments, reducing the size of the congestion window as shown in FIG. 3A and FIG. 3B may enable the job scheduling system 100 to resume approximate FIFO scheduling of batch compute jobs. Approximate FIFO scheduling may not guarantee ordered execution of jobs within the same time interval but may generally represent a FIFO approach from one time interval to the next time interval. In some embodiments, FIFO scheduling may be guaranteed when the parallelism value is reduced to one and when the oldest or highest-priority job is selected for the single execution slot. In some embodiments, by preventing the majority of the computing resources 180 from being dominated by a single job queue, the system 100 may enable fairness among different job queues 120A-120N using a round-robin selection approach. By growing and shrinking the size of the congestion window 145 from time interval to time interval (and execution call to execution call), the system 100 may perform dynamic regulation of parallelism based (at least in part) on resource availability.

Figure 4:
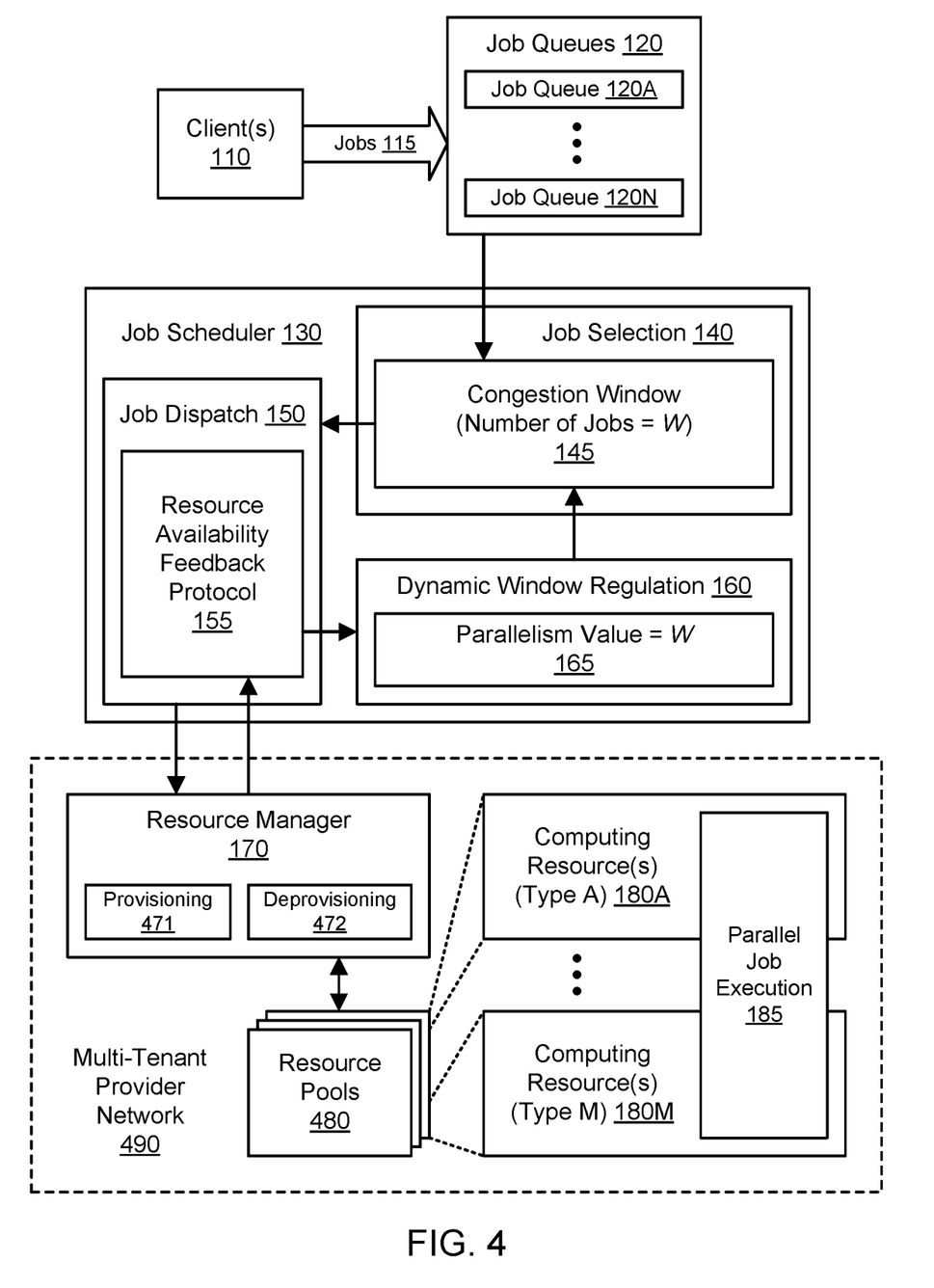
FIG. 4 illustrates further aspects of the example system environment for dynamic regulation of parallelism for job scheduling, including provisioning of computing resources from one or more resource pools of a multi-tenant provider network, according to some embodiments.

FIG. 4 illustrates further aspects of the example system environment for dynamic regulation of parallelism for job scheduling, including provisioning of computing resources from one or more resource pools of a multi-tenant provider network, according to some embodiments. In some embodiments, the computing resources 180 may be implemented within a multi-tenant provider network 490. The provider network 490 may represent a network set up by an entity such as a company or a public-sector organization to provide one or more services (such as various types of network-accessible computing or storage) accessible via the Internet and/or other networks to a distributed set of clients. The provider network 490 may include one or more data centers hosting a plurality of resource pools 480, such as collections of physical and/or virtualized computer servers or other computing resources, storage resources, networking equipment and the like, that are used to implement and distribute the infrastructure and services offered by the provider. The computing resources in the pools 480 may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 490 in different embodiments, including general purpose or special purpose computer servers, storage devices, network devices, and the like. Because resources of the provider network 490 may be under the control of multiple clients (or tenants) concurrently or serially, the provider network may be said to offer multi-tenancy and may be termed a multi-tenant provider network.

In some embodiments, the computing resources 180 provided by the resource pools 480 may vary in their configurations and/or capabilities and may be classified as different resource types. For example, one or more "type A" computing resources 180A may vary from one or more "type M" computing resources 180M in terms of the number of processor cores, the presence or absence of a graphical processing unit (GPU), the type and quantity of internal memory, the type and quantity of attached storage, and so on. The "type A" resources may be provided by a different resource pool than the "type M" resources. At least some of the jobs 115 may require the use of a particular resource type for execution. For example, a particular job may require the use of a GPU to perform a general-purpose GPU (GPGPU) computing task. Job metadata may indicate a minimum configuration of one or more computing resources (e.g., minimum CPU, GPU, and/or memory capabilities) and/or a list of acceptable resource types for the job. The resource manager 170 may attempt to match a job to a particular resource type in a particular pool, e.g., based on resource requirements of the job. If the multiple resource pools 480 cannot meet the resource requirements for a particular job during a particular time interval, then the resource manager 170 may report back to the job scheduler 130 that the number of computing resources was insufficient for scheduling all the jobs for that interval, even if other computing resources that do not satisfy the job's requirements remain available.

The resource manager 170 may include a component 471 for provisioning individual ones of the computing resources 180 from the resource pool(s) 480. Provisioning 471 a computing resource may include tasks such as selecting an appropriate resource pool, reserving the resource from the selected pool such that the resource is usable by one client at a time, and configuring the resource for one or more specific operations (e.g., parallel job execution 185). The resource manager 170 may include a component 472 for deprovisioning individual ones of the computing resources 180. Deprovisioning 472 a computing resource may include tasks such as terminating the resource, erasing the contents of any memory and/or storage used by the previous client, and returning the resource to the resource pool(s) 480 such that the resource is available for use by other clients in the future.

Aspects of the provider network 490 may be hosted in the cloud, and the network may be referred to as a cloud provider network. A cloud provider network (sometimes referred to simply as a "cloud") refers to a pool of network-accessible computing resources (such as compute, storage, and networking resources, applications, and services) which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network such as a fiber communication connection. An availability zone (also known as an availability domain, or simply a "zone") refers to an isolated failure domain including one or more data center facilities with separate power, separate networking, and separate heating/cooling from those in another availability zone. Availability zones within a region may be positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and TCs may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Figure 5:
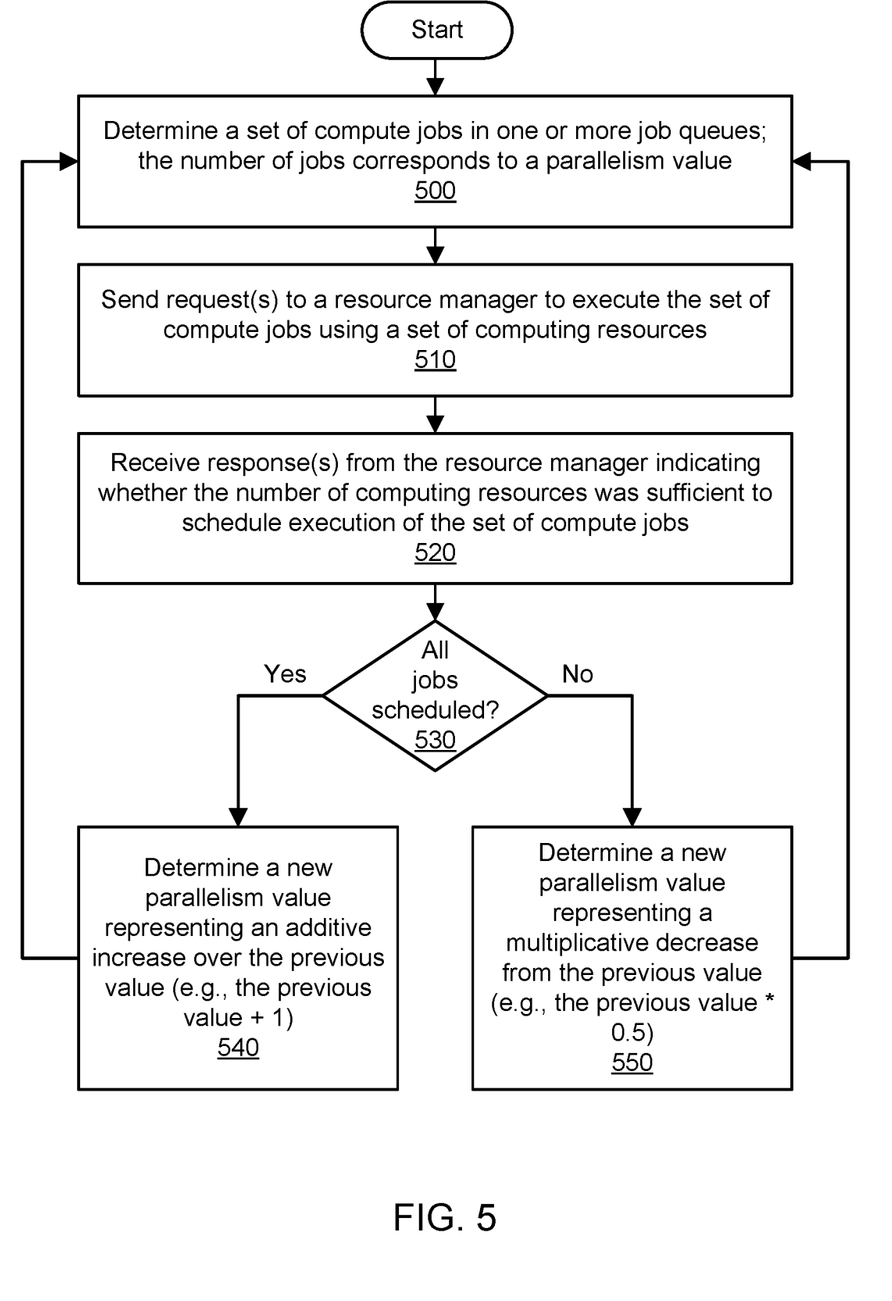
FIG. 5 is a flowchart illustrating a method for dynamic regulation of parallelism for job scheduling, according to some embodiments.

FIG. 5 is a flowchart illustrating a method for dynamic regulation of parallelism for job scheduling, according to some embodiments. As shown in 500, a set of compute jobs may be selected or otherwise determined from one or more job queues by a job scheduler. In one embodiment, the job queue(s) may be associated with a single client of the job scheduler. In one embodiment, the job queue(s) may be associated with a plurality of clients of the job scheduler. The jobs may be sorted by creation date, submission date, or date of receipt in order to perform approximate FIFO scheduling. In one embodiment, the jobs may be sorted according to a priority value such that higher-priority jobs tend to be scheduled before lower-priority jobs. The jobs may be taken from the queues by a plurality of worker threads associated with the job scheduler. The number of jobs may correspond to a parallelism value maintained by the job scheduler. The selected jobs may be stored in a congestion window whose size (in number of jobs) corresponds to the parallelism value. In some embodiments, the parallelism value and thus the size of the congestion window may be initialized to a default value, e.g., 1. In some embodiments, the parallelism value and thus the size of the congestion window may be initialized according to a number of computing resources (e.g., compute instances) provisioned to perform concurrent execution of the batch compute jobs. A new set of compute jobs may be determined periodically, e.g., every N seconds.

As shown in 510, the job scheduler may send one or more job execution requests to a resource manager that brokers access to a set of computing resources (e.g., compute instances) provisioned to perform concurrent execution of the batch compute jobs. The set of compute jobs may be sent to the resource manager periodically, e.g., every N seconds, and the set of compute jobs may correspond to a particular interval of time. The job execution request may include the same number of jobs as the parallelism value. In one embodiment, all of the compute jobs for the current time interval may be sent using one request. In one embodiment, the compute jobs for the current time interval may be sent using a plurality of requests. The computing resources may be provisioned by the resource manager from one or more resource pools offered by a multi-tenant provider network. The number of computing resources in the set may vary over time. For example, a particular resource may be terminated or otherwise deprovisioned by the resource manager, thus reducing the availability of the set of resources for batch job execution. As another example, a particular resource may fail and be unable to accept additional compute jobs, thus reducing the availability of the set of resources for batch job execution. As yet another example, an additional resource may be provisioned by the resource manager, thus increasing the availability of the set of resources for batch job execution.

Over time, the number of computing resources may shrink below the parallelism value, thus delaying execution of one or more jobs in a batch beyond the current time interval due to a lack of resource availability. Over time, the number of computing resources may grow beyond the parallelism value, thus leaving one or more computing resources idle for one or more time intervals. To adapt the job scheduling to the current availability of the computing resources, a resource availability feedback protocol may be used to dynamically modify the parallelism value and thus the size of the congestion window. As shown in 520, the job scheduler may receive one or more responses to the execution request from the resource manager. The response(s) may be received at the end of the current time interval or at the start of the next time interval. The response(s) may indicate whether the number or amount of computing resources was sufficient to schedule execution of all of the set of compute jobs for their corresponding interval of time. The number or amount of computing resources may be deemed sufficient if all the jobs were successfully scheduled for their time interval and insufficient otherwise (e.g., if at least one of the jobs could not be scheduled). In one embodiment, the successful or unsuccessful scheduling of individual jobs may be reported to individual worker threads of the job scheduler, and the job scheduler may aggregate the individual responses to determine whether all of the jobs were scheduled successfully. If the scheduler receives a single response from the resource manager, the response may include a signal or parameter value such as "continue" if all jobs were scheduled or a signal or parameter value such as "slow down" if not all jobs were scheduled. In some embodiments, the resource manager may report back to the job scheduler that the number of computing resources was insufficient for scheduling a particular job with particular resource requirements, even if other computing resources that do not satisfy the job's requirements remain available for that interval.

As shown in 530, the method may determine whether all the jobs were scheduled for the previous time interval. If so, then as shown in 540, a new parallelism value may be determined that represents an increase in the size of the congestion window and an increase in the number of jobs that can be submitted with the next request for batch job execution. In some embodiments, the increase may be additive, where the new parallelism value is the old parallelism value plus another number (e.g., one) to implement steady growth. In some embodiments, the increase may be multiplicative, where the new parallelism value is the old parallelism value times a factor greater than one (e.g., 1.1) to implement steady growth. The same additive number or factor may be used across multiple time intervals. After the new parallelism value has been determined, the method may continue as shown in 500.

However, if all the jobs were not scheduled for the previous time interval, then as shown in 550, a new parallelism value may be determined that represents a decrease in the size of the congestion window and a decrease in the number of jobs that can be submitted with the next request for batch job execution. In some embodiments, the decrease may be multiplicative, e.g., such that the new parallelism value is the old parallelism value times a factor smaller than one (e.g., 0.5) or divided by a divisor larger than one (e.g., two). In some embodiments, the decrease may be subtractive, e.g., such that the new parallelism value is the old parallelism value minus a number. The same multiplicative factor or subtractive number may be used across multiple time intervals. After the new parallelism value has been determined, the method may continue as shown in 500.

Illustrative Computer System

In at least some embodiments, a computer system that implements a portion or all of one or more of the technologies described herein may include a computer system that includes or is configured to access one or more computer-readable media. FIG. 6 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 6 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    a resource manager configured to provision a plurality of computing resources from one or more resource pools of a multi-tenant provider network; and
    a job scheduler comprising one or more processors and one or more memories to store computer-executable instructions that, when executed, cause the one or more processors to:
        determine a first set of compute jobs in a plurality of job queues, wherein a number of the first set of compute jobs corresponds to a first parallelism value;
        send, to the resource manager, a first request to execute the first set of compute jobs using the plurality of computing resources;
        receive, from the resource manager, a first response to the first request, wherein the first response indicates that a number of the computing resources was sufficient to schedule the first set of compute jobs;
        determine a second set of compute jobs in the plurality of job queues, wherein a number of the second set of compute jobs corresponds to a second parallelism value, and wherein the second parallelism value is increased additively with respect to the first parallelism value and responsive to the first response;
        send, to the resource manager, a second request to execute the second set of compute jobs using the plurality of computing resources;
        receive, from the resource manager, a second response to the second request indicating that the number of the computing resources was insufficient to schedule the second set of compute jobs;
        determine a third set of compute jobs in the plurality of job queues, wherein a number of the third set of compute jobs corresponds to a third parallelism value, wherein the third parallelism value is decreased multiplicatively with respect to the second parallelism value and responsive to the second response; and
        send, to the resource manager, a third request to execute the third set of compute jobs using the plurality of computing resources.

2. The system as recited in claim 1, wherein the first set of compute jobs are executed in first-in first-out (FIFO) order.

3. The system as recited in claim 1, wherein the first set of compute jobs are selected from more than one of the job queues, and wherein the second set of compute jobs are selected from more than one of the job queues.

4. The system as recited in claim 1, wherein the third parallelism value represents a smaller number than the second parallelism value based at least in part on one or more of the computing resources failing or being returned to the one or more resource pools of the multi-tenant provider network.

5. A method, comprising:
    sending, by a job scheduler to a resource manager, a first one or more requests to execute a first set of compute jobs using a set of computing resources, wherein a number of the first set of compute jobs corresponds to a first parallelism value;
    receiving, by the job scheduler from the resource manager, a first one or more responses to the first one or more requests, wherein the first one or more responses indicate that the set of computing resources was sufficient or insufficient to schedule the first set of compute jobs; and
    if the set of computing resources was sufficient to schedule the first set of compute jobs, sending, by the job scheduler to the resource manager, a second one or more requests to execute a second set of compute jobs using the set of computing resources, wherein a number of the second set of compute jobs corresponds to a second parallelism value determined based at least in part on the first one or more responses, and wherein the second parallelism value represents an increase over the first parallelism value; or
    if the set of computing resources was insufficient to schedule the first set of compute jobs, sending, by the job scheduler to the resource manager, a third one or more requests to execute a third set of compute jobs using the set of computing resources, wherein a number of the third set of compute jobs corresponds to a third parallelism value determined based at least in part on the first one or more responses, and wherein the third parallelism value represents a decrease from the first parallelism value.

6. The method as recited in claim 5, wherein the second parallelism value is determined by adding a number to the first parallelism value.

7. The method as recited in claim 6, wherein a number of the computing resources was sufficient to schedule the first set of compute jobs, and wherein the method further comprises:
    receiving, by the job scheduler from the resource manager, a second one or more responses to the second one or more requests, wherein the second one or more responses indicate that a number of the computing resources was insufficient to schedule the second set of compute jobs; and
    sending, by the job scheduler to the resource manager, a fourth one or more requests to execute a fourth set of compute jobs using the set of computing resources, wherein a number of the fourth set of compute jobs corresponds to a fourth parallelism value determined based at least in part on the second one or more responses, and wherein the fourth parallelism value represents a multiplicative decrease with respect to the second parallelism value.

8. The method as recited in claim 5, wherein the third parallelism value is determined by multiplying the first parallelism value by a factor or dividing the first parallelism value by a divisor.

9. The method as recited in claim 8, wherein a number of the computing resources was insufficient to schedule the first set of compute jobs, and wherein the method further comprises:

receiving, by the job scheduler from the resource manager, a third one or more responses to the third request, wherein the second one or more responses indicate that a number of the computing resources was sufficient to schedule the third set of compute jobs; and sending, by the job scheduler to the resource manager, a fourth one or more requests to execute a fourth set of compute jobs using the set of computing resources, wherein a number of the fourth set of compute jobs corresponds to a fourth parallelism value determined based at least in part on the third one or more responses, and wherein the fourth parallelism value represents an additive increase over the third parallelism value.

10. The method as recited in claim 5, wherein the second parallelism value or the third parallelism value is determined based at least in part on a rate limiting factor associated with one or more dependent services.

11. The method as recited in claim 5, wherein the first set of compute jobs and the second set of compute jobs or the third set of compute jobs are selected from a plurality of job queues.

12. The method as recited in claim 5, wherein a plurality of the computing resources are provisioned by the resource manager from a plurality of resource pools of a multi-tenant provider network, and wherein individual ones of the computing resources vary in configuration.

13. One or more non-transitory computer-readable storage media storing program instructions that, when executed on or across one or more processors, perform:

sending, by a job scheduler to a resource manager, a first request to execute a first set of compute jobs using a set of computing resources, wherein a number of the first set of compute jobs corresponds to a first parallelism value;

receiving, by the job scheduler from the resource manager, a first response to the first request, wherein the first response indicates that a number of the computing resources was sufficient or insufficient to schedule the first set of compute jobs; and if the number of the computing resources was sufficient to schedule the first set of compute jobs, sending, by the job scheduler to the resource manager, a second request to execute a second set of compute jobs using the set of computing resources, wherein a number of the second set of compute jobs corresponds to a second parallelism value determined based at least in part on the first response, and wherein the second parallelism value represents an additive increase over the first parallelism value; or if the number of the computing resources was insufficient to schedule the first set of compute jobs, sending, by the job scheduler to the resource manager, a third request to execute a third set of compute jobs using the set of computing resources, wherein a number of the third set of compute jobs corresponds to a third parallelism value determined based at least in part on the first response, and wherein the third parallelism value represents a multiplicative decrease from the first parallelism value.

14. The one or more non-transitory computer-readable storage media as recited in claim 13, wherein the number of the computing resources was sufficient to schedule the first set of compute jobs, and wherein the one or more non-transitory computer-readable storage media further comprise additional program instructions that, when executed on or across the one or more processors, perform:

receiving, by the job scheduler from the resource manager, a second response to the second request, wherein the second response indicates that a number of the computing resources was insufficient to schedule the second set of compute jobs; and sending, by the job scheduler to the resource manager, a fourth request to execute a fourth set of compute jobs using the set of computing resources, wherein a number of the fourth set of compute jobs corresponds to a fourth parallelism value determined based at least in part on the second response, and wherein the fourth parallelism value represents a multiplicative decrease with respect to the second parallelism value.

15. The one or more non-transitory computer-readable storage media as recited in claim 13, wherein the number of the computing resources was insufficient to schedule the first set of compute jobs, and wherein the one or more non-transitory computer-readable storage media further comprise additional program instructions that, when executed on or across the one or more processors, perform:

receiving, by the job scheduler from the resource manager, a third response to the third request, wherein the second response indicates that a number of the computing resources was sufficient to schedule the third set of compute jobs; and sending, by the job scheduler to the resource manager, a fourth request to execute a fourth set of compute jobs using the set of computing resources, wherein a number of the fourth set of compute jobs corresponds to a fourth parallelism value determined based at least in part on the third response, and wherein the fourth parallelism value represents an additive increase over the third parallelism value.

16. The one or more non-transitory computer-readable storage media as recited in claim 13, wherein the first set of compute jobs and the second set of compute jobs or the third set of compute jobs are selected from a plurality of j ob queues.

17. The one or more non-transitory computer-readable storage media as recited in claim 13, wherein the first set of compute jobs are selected from more than one of the job queues, and wherein the second set of compute jobs are selected from more than one of the job queues.

18. The one or more non-transitory computer-readable storage media as recited in claim 13, wherein the first set of compute jobs and the second set of compute jobs are ordered by time in one or more job queues, and wherein the first set of compute jobs is executed in first-in first-out (FIFO) order with respect to the second set of compute jobs if the number of the computing resources was sufficient to schedule the first set of compute jobs.

19. The one or more non-transitory computer-readable storage media as recited in claim 13, wherein the one or more computing resources are provisioned by the resource manager from one or more resource pools of a multi-tenant provider network.

20. The one or more non-transitory computer-readable storage media as recited in claim 19, wherein the third parallelism value represents a smaller number than the first parallelism value based at least in part on one or more of the computing resources failing or being returned to the one or more resource pools of the multi-tenant provider network.

* * * * *